(12) United States Patent
Schneider

(10) Patent No.: US 6,431,583 B1
(45) Date of Patent: Aug. 13, 2002

(54) INFLATABLE KNEE BOLSTER WITH EXTERNAL TETHERING

(75) Inventor: David W. Schneider, Waterford, MI (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 09/795,961

(22) Filed: Feb. 28, 2001

(51) Int. Cl.⁷ ............................................... B60R 21/16
(52) U.S. Cl. .................................. 280/728.2; 280/743.2
(58) Field of Search ........................... 280/728.1, 728.2, 280/731, 733, 743.2, 743.1

(56) References Cited

U.S. PATENT DOCUMENTS

| 5,536,043 A | | 7/1996 | Lang et al. | |
|---|---|---|---|---|
| 5,931,493 A | | 8/1999 | Sutherland | |
| 6,076,849 A | * | 6/2000 | Holzapfel et al. | 280/728.2 |
| 6,189,916 B1 | * | 2/2001 | Bowers et al. | 280/728.3 |
| 6,279,942 B1 | * | 9/2001 | Bossenmaier et al. | 280/728.2 |

* cited by examiner

Primary Examiner—Paul N. Dickson
Assistant Examiner—Faye M. Fleming
(74) Attorney, Agent, or Firm—Sally J. Brown; James D. Erickson (57) ABSTRACT

A knee airbag system is configured to be disposed in an instrument panel of a vehicle. The knee airbag system has a modular housing which is connected to the instrument panel of the vehicle. An inflatable airbag and an inflator are disposed within the modular housing. In an accident situation, the inflator inflates the airbag to protect an occupant of the vehicle. The system further includes a load distributor which is moved by the inflating airbag from a stored position adjacent the instrument panel and a deployed position away from the instrument panel. When the load distributor is in the deployed position, it provides further support and protection for the vehicle occupant. A tether allows for positioning of the load distributor in the deployed position. The tether is external to the airbag and connected to the load distributor and the modular housing.

35 Claims, 4 Drawing Sheets

INFLATABLE KNEE BOLSTER WITH EXTERNAL TETHERING

FIELD OF THE INVENTION

The present invention relates to inflatable airbag apparatuses for protection of an occupant in a motor vehicle, and more specifically, to an airbag system for deployment in front of the knee area of an occupant.

TECHNICAL BACKGROUND

Inflatable airbags are well accepted in their use in motor vehicles and have been attributed with preventing numerous deaths in accidents. According to one report, frontal airbags reduce fatalities in head-on collisions by 25% among drivers using seat belts and by more than 30% among unbelted drivers. Statistics further suggest that with a combination of seat belts and airbags, serious chest injuries in frontal collisions can be reduced by 65% and serious head injuries by up to 75%. Airbag use provides clear safety benefits, and vehicle owners are frequently willing to pay the added expense for airbags.

A modem airbag apparatus may include an electronic control unit (ECU) and one or more airbag modules. The ECU is usually installed in the middle of an automobile, between the passenger and engine compartment. If the vehicle has only a driver's side airbag, the ECU may be mounted in the steering wheel. The ECU includes a sensor which continuously monitors the acceleration and deceleration of the vehicle and sends this information to a processor which processes an algorithm to determine if the vehicle is in an accident situation.

When the processor determines that there is an accident situation, the ECU transmits an electrical current to an initiator in the airbag module. The initiator triggers operation of the inflator or gas generator which may use a combination of compressed gas and solid fuel. The inflator inflates a textile airbag to impact a passenger and prevent injury to the passenger. In some airbag apparatuses, the airbag may be fully inflated within 50 thousandths of a second and deflated within two tenths of a second.

An airbag cover conceals a compartment containing the airbag module and may be located on a steering wheel, dashboard, vehicle door, or vehicle wall. The airbag cover is typically made of a rigid plastic and may be forced opened by the pressure from the deploying airbag. In deploying the airbag, it is preferable to retain the airbag cover to prevent the airbag cover from flying loose in the passenger compartment. If the airbag cover is not retained, a passenger may be injured by the rigid cover as it is tossed about in the passenger compartment during an accident.

Airbag apparatuses have been primarily designed for deployment in front of the torso of an occupant. More specifically, airbags are disposed for deployment between the upper torso of an occupant and the windshield and instrument panel. During a front end collision, there is a tendency for an occupant, particularly one who is not properly restrained by a seat belt, to slide forward along the seat and "submarine" under the airbag (hereinafter referenced as the "primary airbag").

In order to prevent such an occurrence, a knee airbag system has been developed to engage an occupant's knees or lower legs and prevent submarining under the primary airbag. The knee airbag system includes a knee airbag which deploys during an accident to restrain forward movement of an occupant's knees and legs. The knee airbag system may also include a fixed panel, referred to as a knee bolster panel, which is disposed in front of a knee airbag. The knee bolster panel provides a more rigid surface area than an airbag alone to better engage the knees or lower legs of an occupant to thereby restrain the occupant's lower body. Nevertheless, the knee bolster panel does provide for some degree of deformation to minimize the impact to an occupant.

When the airbag is inflated, the knee bolster panel is propelled rearward, away from the instrument panel and toward the occupant. To prevent injury to the occupant and allow for proper positioning of the knee bolster panel, the knee bolster panel should be restrained. Some knee bolster systems have secured the bolster panel directly to the airbag, the airbag serving to tether the knee bolster to the instrument panel of the vehicle. However, the stress placed on the airbag in this system can cause the airbag to tear reducing the efficacy of the airbag system. Moreover, the torn airbag may release the knee bolster into the passenger compartment, potentially injuring an occupant. Moreover, it is difficult to configure the knee bolster to the airbag so that the knee bolster is positioned correctly in the event of an accident.

Some airbag systems provide tethers to better secure the knee bolster panel. One such airbag system has tethers which are positioned inside the airbag. The internal tethers may cause problems with the proper deployment of the airbag. Thus, the airbag system must be carefully designed and assembled to prevent any interference by the tethers. Because the tethers are internal to the airbag, the bolster panel must still be directly attached to the airbag which may cause the airbag to tear or malfunction.

To overcome some of the problems associated with the internally tethered knee bolster systems, externally tethered knee bolster systems have been developed. These systems provide an attachment member for securing the tethers to the instrument panel or casing of the airbag system. The tethers are sewn directly to the attachment member and to the knee bolster panel. The attachment member is then secured to the instrument panel or the casing of the airbag system.

The externally tethered systems also have a number of disadvantages. First sewing the tethers directly to the bolster panel and the attachment member can be difficult and increases the cost of the airbag system. Moreover, the tethers are generally made from long fabric strips which must be folded to properly fit within the casing of the airbag system. Overtime, the tethers may begin to unfold which may cause the airbag system to malfunction in a crash situation. Additionally, the unfolded tethers may protrude from the casing and become visible to an occupant of the vehicle. The protruding tethers may be inadvertently damaged as a vehicle occupant repeatedly brushes against them. Moreover, an occupant, especially a child, may tamper with the tethers damaging the system or potentially triggering the airbag injuring the occupant.

As a general rule, the final cost of a device is increased by the number of parts and steps required to manufacture the device. The cost of the available externally tethered airbag systems is increased by the requirement of an attachment member to secure the tethers to the instrument panel or casing of the airbag system. The cost is further increased by the complexity of sewing the tethers directly to the attachment member.

In light of the foregoing, it would be a significant advancement in the art to provide a knee airbag system with an externally tethered knee bolster. It would be an additional advancement if the airbag system had a limited number of fasteners and components. It would be a further advancement to prevent the protrusion of the tethers. It would be a further advancement if the airbag system were simple to install into a vehicle.

BRIEF SUMMARY OF THE INVENTION

The present invention is an airbag system for restraining and protecting an occupant of a vehicle in the event of a crash situation. The airbag system is designed to support the knee portion of an occupant to prevent the submarining of an occupant under the primary airbag. The knee airbag system may be disposed in the lower portion of an instrument panel.

The knee airbag system may include an inflatable airbag and an inflator for inflating the airbag when the ECU detects an accident situation. The inflatable airbag and the inflator may be stored in a modular housing. The modular housing is configured to be attached to the instrument panel or fire wall of a vehicle near the knees of an occupant.

A load distributor or bolster panel may be positioned between the airbag and the occupant. The load distributor may move from a stored position adjacent the instrument panel and a deployed position away from the instrument panel. The load distributor is moved from the stored position to the deployed position as the airbag is inflated. In the deployed position, the load distributor provides support to the lower portion of an occupant's body, thereby preventing submarining of the occupant and reducing injury.

The load distributor may be tethered to the instrument panel or the modular housing by one or more tethers external to the airbag. The tethers prevent the load distributor from flying into the passenger compartment in an accident situation. The tethers have a length sufficient to allow for the proper positioning of the deployed load distributor adjacent the lower portion of an occupant's body.

The tethers may be secured in the stored position by one or more breakaway stitches. The breakaway stitches allow the tethers to be positioned within the modular housing in the stored position. When the inflator is activated in an accident situation, the airbag inflates and applies pressure to the breakaway stitches which give way, allowing the load distributor to move to the deployed position. The breakaway stitches provide an economical means for securing the tethers within the modular housing and preventing protrusion of the tethers or inadvertent damage or tampering with the airbag system.

The modular housing may have a stud for attachment of the inflator to the modular housing. The tethers may be attached to the modular housing in a variety of ways. For example, the tether may be secured over the stud on the side of the modular housing adjacent the airbag. The modular housing may have one or more apertures which allow access to the rear surface of the modular housing, and the tethers may be secured to the stud adjacent the external surface of the modular housing. Additionally, the apertures may be configured to clamp on the tether as the airbag is deployed.

The tethers may be attached to the load distributor in variety of ways. For example, the distributor may have one or more slots. The tether may be inserted through the slots and the ends of the tether secured to the modular housing. Alternatively, an end of the tethers may be inserted through the slots and held in place by a pin inserted through a loop at the end of the tether. The slots may have a configuration that clamps down on the tether when the airbag is inflated.

It may be desirable to attach a portion of the tether to the airbag. This attachment may be helpful in the assembly of the airbag system and aid in the positioning of the bolster panel/load distributor and tethers in the stored and deployed positions. A pivoting tether external to the airbag may be provided for proper positioning of the load distributor in the deployed position.

BRIEF DESCRIPTION OF THE DRAWINGS

In order that the manner in which the advantages and features of the invention are obtained, a more particular description of the invention summarized above will be rendered by reference to the appended drawings. These drawings only provide selected embodiments of the invention and are not therefore to be considered limiting of the scope. The invention will be described and explained with additional specificity and detail through the use of the accompanying drawings.

DETAILED DESCRIPTION OF THE INVENTION

The invention is now described with reference to the FIGS. 1–7, where like reference numbers indicate identical or functionally similar elements. The members of the present invention, as generally described and illustrated in the Figures, may be implemented in a wide variety of configurations. Thus, the following more detailed description of the embodiments of the system and method of the present invention, as represented in the Figures, is not intended to limit the scope of the invention, as claimed, but is merely representative of presently preferred embodiments of the invention.

Figure 1:
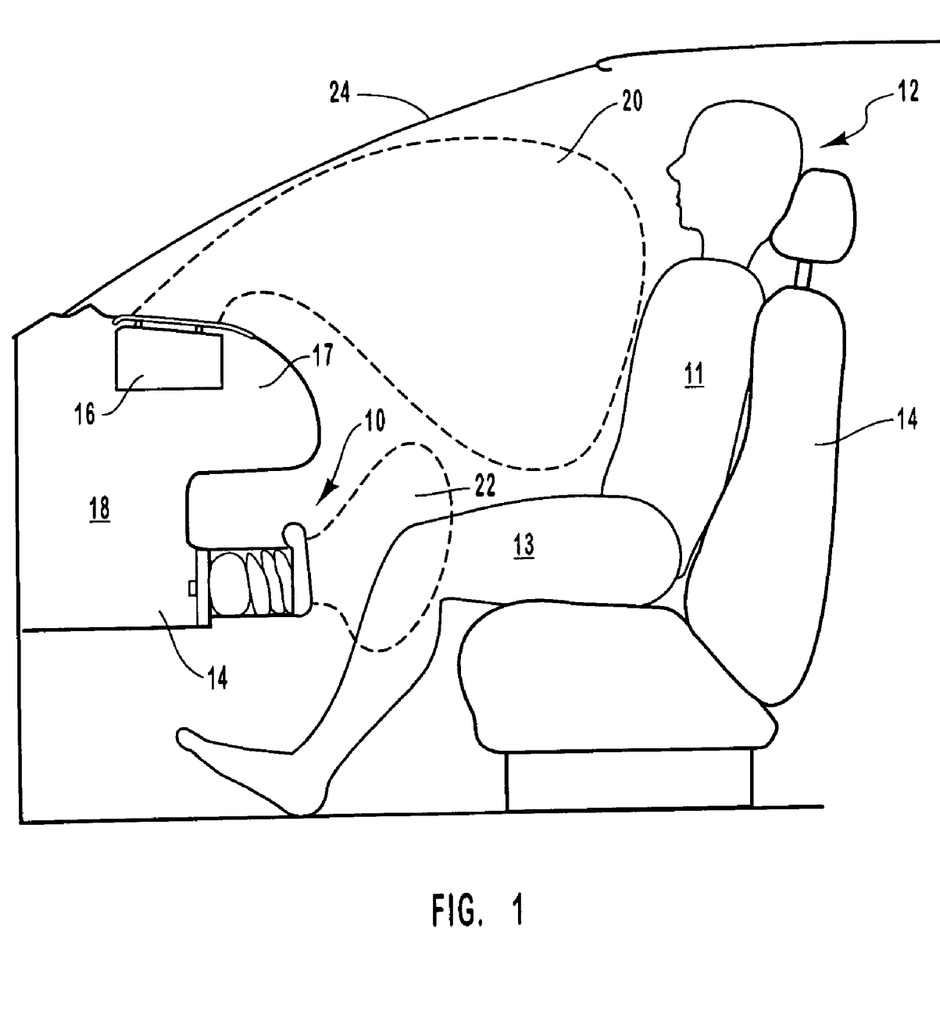
FIG. 1 is a cross sectional view of the passenger compartment of an automobile, wherein the automobile includes primary and knee airbag systems.

Referring to FIG. 1, one embodiment of a knee airbag system 10 that may be used with the present invention is shown. The knee airbag system 10 is shown relative to an occupant 12 seated in a front seat 14 in an automobile. The knee airbag system 10 may be used in combination with a primary airbag system 16 mounted in an upper portion 17 of an instrument panel 18. The primary airbag system 16 is disposed to deploy in front of an occupant's torso 11. The knee airbag system 10 may be mounted to the lower portion 19 of the instrument panel 18 in front of the occupant's knees and lower legs 13. One of skill in the art will appreciate that the knee airbag system 10 may be disposed in various locations, all of which are included within the scope of the invention.

Upon receipt of an activation signal transmitted from a crash sensor mounted elsewhere on the automobile, the primary airbag system 16 and the knee airbag system 10 inflate their respective airbags 20, 22 (shown in dotted lines) into the inflated positions.

In the inflated position, the primary airbag 20 restrains the occupant's upper torso 11 from being propelled forward into the windshield 24 and the upper portion 17 of the instrument panel 18. At this time, there is a tendency for the lower portion 13 of the occupant's body to be propelled forward and under the primary airbag 20 (hereinafter referred to as "submarining"). This tendency is pronounced when the occupant 12 is not restrained by a seat belt, or if the seat belt is not properly tensioned over the occupant's lap. To compensate for submarining, the knee airbag 22 deploys and expands into an inflated position to hold the knees and lower legs 13 from sliding forward. This causes the lower portion 13 of the occupant's body to resist submarining.

Figure 2:
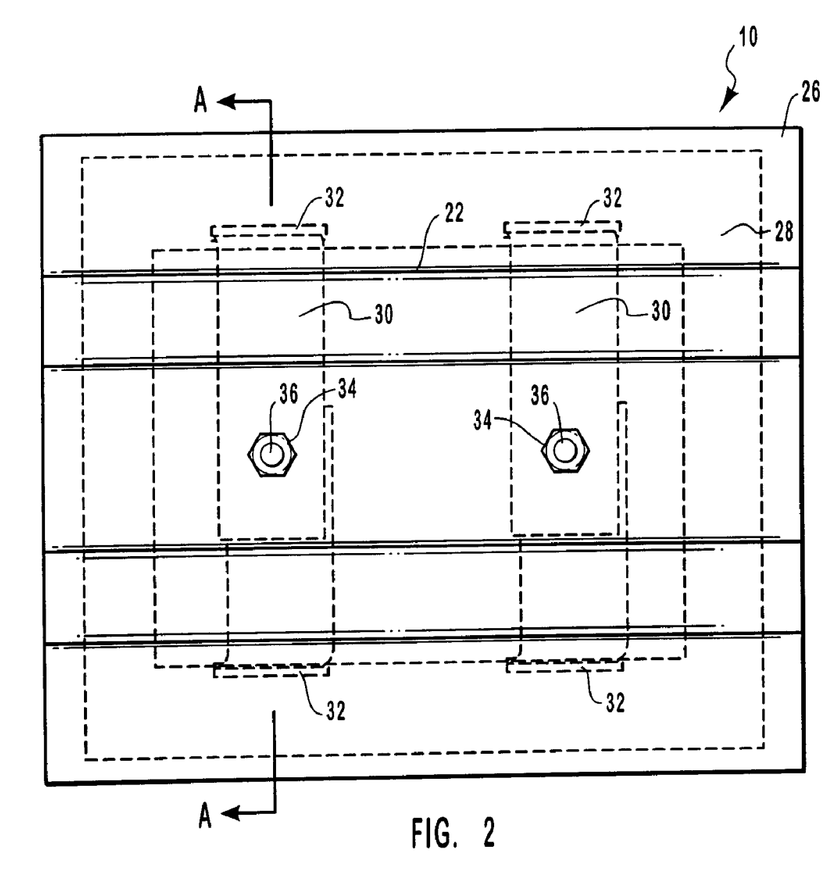
FIG. 2 is a plan view of one embodiment of the knee airbag system of the present invention.

Referring to FIG. 2, a plan view of one embodiment of a knee airbag system 10 of the present invention is shown. The system 10 may include a load distributor 28 or knee bolster panel 28 which is disposed adjacent the exterior surface 23 of the knee airbag 22. Upon deployment, the load distributor 28 provides a rigid surface area to engage the occupant 12 to thereby prevent submarining of the occupant's lower body 13 under the primary airbag 20.

The load distributor's 28 primary function is to provide a rigid surface that prevents the occupant 12 from submarining under the primary airbag 20. In some embodiments the portions of the knee airbag system 10, such as tethers 30 and fasteners may be exposed on the surface of the load distributor 28. The exposed components of the airbag system 10 may be unsightly and expose the system 10 to inadvertent damage or tampering.

Figure 3:
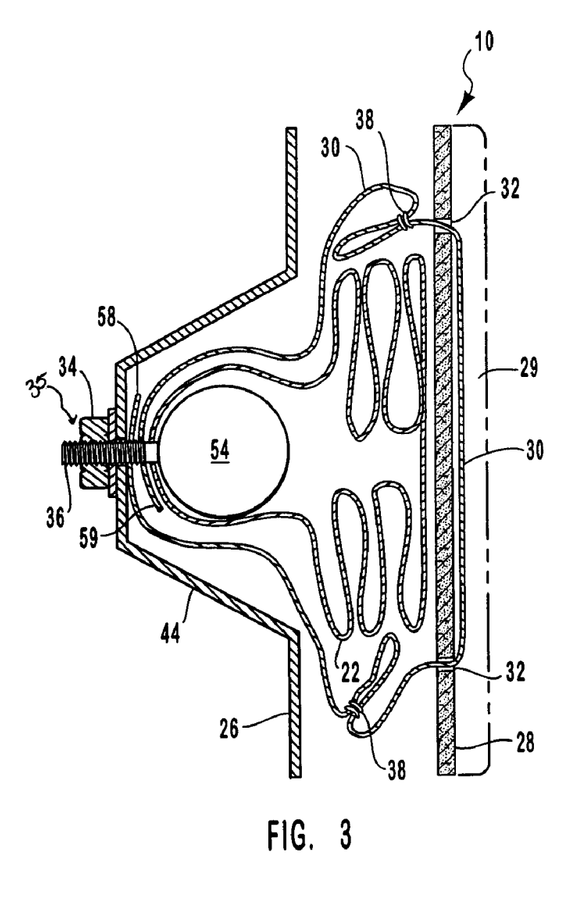
FIG. 3 is a cross sectional view of the knee airbag system of FIG. 2 taken across line A—A.

As illustrated in FIG. 3, the aesthetic appeal of the knee airbag system 10 may improved by including a panel member 29 that is secured to the exterior of the load distributor 28 such that the panel member is deployed in front of an occupant's knees and lower legs. Moreover, the panel member 29 may prevent damage to the tethers 30 and other components of the knee airbag system 10. The panel member 29 may be secured to the load distributor 28 through the use of clips, screws, adhesives, or other types of fasteners. The exterior of the panel member 29 can be contoured and color coordinated with the exterior surface of the instrument panel 18 to present a pleasing packaged system 10. In this manner, the components of the knee bolster system may be shielded from the view of the occupant and protected from tampering. The panel member 29 may also be padded to cushion the impact of the load distributor 28 into an occupant 12 in a crash situation.

The system 10 further includes a modular housing 26 which contains the various elements of the airbag system 10 such as the inflator 54 and the deflated knee airbag 22. One or more tethers 30 may secure the load distributor 28 to the modular housing 26. The tethers 30 are preferably constructed from a fabric material that yields very little when stretched. The tethers 30 are constructed to withstand the force of the expanding airbag 22. In order to provide sufficient strength and minimal yield, the tethers 30 can be constructed from strips of fabric such as polyester or nylon, and the width of the strips may be increased to strengthen the tethers 30.

There are many ways to secure the tethers 30 to the load distributor. For example, the attachment slots 32 can be located in the load distributor 28. The tethers 30 can be inserted through the attachment slot 32 and secured to the modular housing 26 by a fastener 35. The fastener 35 may be any of many fasteners known in the art such as a bolt, a screw, a clip, a rivet, an adhesive, and the like. The modular housing 26 is configured to be readily attached to the instrument panel 18 of a vehicle.

Referring to FIG. 3, a cross sectional view of the system 10 is shown taken across line A—A of FIG. 2. The housing 26 may be secured to a wall, such as a firewall or the back wall of the instrument panel 18.

The housing 26 contains an inflator 54 for deploying the knee airbag 22 in the event of an accident. As illustrated in FIG. 3, the inflator 54 is attached to the modular housing 26 by a threaded stud 36 and a nut 34. Alternatively, the inflator 54 may be secured to the modular housing 26 by other means known in the art including, but not limited to, welds, solder, adhesives, rivets, and screws. The inflator 54, is a gas generator which may use compressed gas, solid fuel, or a combination of compressed gas and solid fuel to inflate the knee airbag. The inflator 54 is activated by an initiator (not shown) that is in electrical communication with an electronic control unit (ECU) (not shown) mounted elsewhere on the vehicle. When the ECU determines that the vehicle is in an accident, the ECU sends an electronic signal to the initiator which causes the inflator 54 to deploy the knee airbag 22. The knee airbag 22 and the load distributor 28 are shown in the stored position. As the knee airbag 22 inflates, the load distributor is pushed away from the instrument panel 18 and toward the occupant 12 into the deployed position. The tethers 30 are of a sufficient length to allow the load distributor 28 to move into the blocking position. The airbag 22 is configured to deflate soon after reaching the deployed position so that the occupant 12 is not pinned in the vehicle by the inflated airbag 22.

One or more tethers 30 are provided to position the load distributor 28 in the correct deployed position and to prevent the load distributor 28 from being propelled into the passenger compartment by the inflating airbag 22. The tethers 22 are preferably constructed of a fabric material. It is presently preferred that the fabric material be flexible enough to be folded and stored within the modular housing in the stored position. However, the fabric material should have a small amount of yield when stretched for correct and predictable positioning of the load distributor 28 in the deployed position. Such materials are known by those of skill in the art.

The tethers 30 can have a strip-like configuration. The length and width of the tethers 30 may vary depending on the vehicle and inflator used. However, the tethers 30 should be of sufficient length to allow the load distributor 28 to be extended sufficient to block the lower portion 13 of the occupant's body. The tethers 30 should be wide enough to inhibit twisting of the tethers 30 and to withstand the force of the inflating airbag 22.

As illustrated in FIG. 3, the load distributor 28 is configured with one or more slots 32 for receiving the tethers 30. The load distributor 28 is coupled to the tethers 30 by inserting opposite ends 58, 59 of the tethers 30 through two parallel slots 32. The ends 58, 59 of the tether 30 are then secured to the modular housing 26 by a fastener 35. The fastener 35 can be any suitable fastener known in the art including but not limited to a bolt, a screw, a rivet, and a clamp. To limit the cost of manufacturing the knee airbag system, the stud 36 which fastens the inflator 54 to the modular housing 26 may also be used to fasten the tethers 30 to the housing 26. The tethers 30 may have reinforced openings (not shown) adjacent the ends 58, 59 of the tethers 30. The openings are placed over the stud 36 and the stud 36 mounted to the modular housing. In this manner the number of parts and steps required to assemble the knee airbag system 10 is reduced which will decrease the cost of production of the system 10.

With the airbag system 10 in the stored position, the tethers 30 are longer than the distance between the fastener 35 and the load distributor 28. This excess length should be contained within the modular housing 26 to prevent the tethers 30 from becoming exposed to a vehicle occupant 12 over time. The tether 30 can be contained by folding the tether 30 back upon itself and fastening the folded tether 30 with one or mote temporary fasteners 38. The temporary fasteners 38 secure the excess length of the tether 30 in the stored position, but release as the airbag 22 inflates and places pressure on the tethers 30. It is presently preferred that the temporary fasteners 38 be breakaway stitches 38. Other temporary fasteners 38 are known by those of skill in the art. The breakaway stitches 38 have the advantage of holding the tethers 30 within the housing 26 in the stored position and giving way for the tethers 30 to extend into the blocking position. In this manner, the tethers 30 may be safely stored within the housing 28 without the need for painstakingly folding the tethers 30 during assembly of knee airbag system 10.

Figure 4:
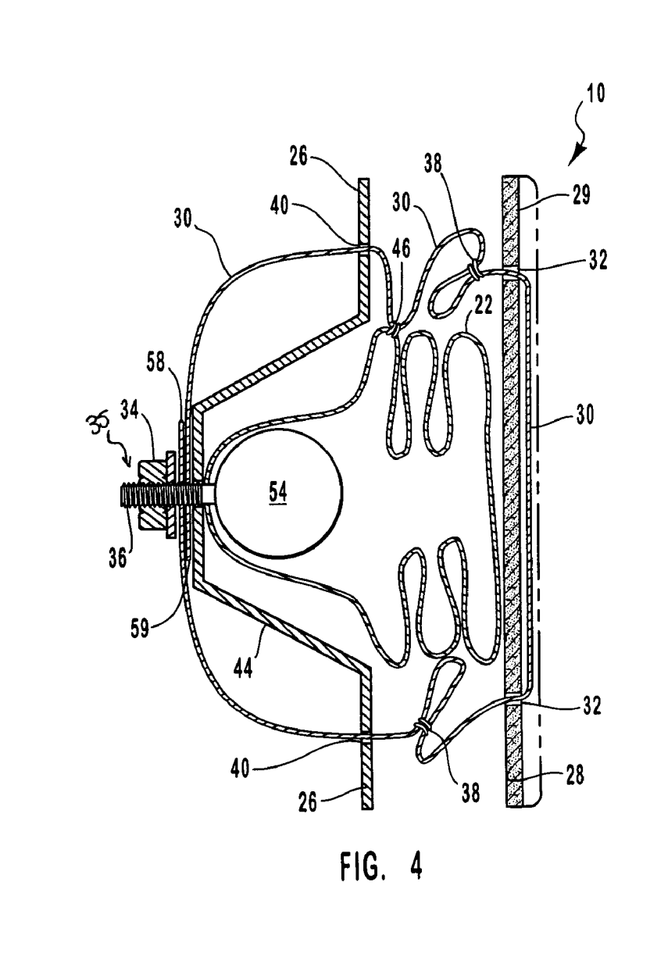
FIG. 4 is a cross sectional view of an alternate embodiment of the knee airbag system of FIG. 2 taken across line A—A.

Referring now to FIG. 4, a cross sectional view of an alternate embodiment of the knee airbag system 10 is shown taken across line A—A of FIG. 2. In this alternate embodiment, one or more of the tethers 30 are attached to the airbag 22 for proper positioning of the airbag system 10 in the stored and deployed positions. The tethers 30 may be attached to the airbag 22 by a stitch 46. The stitch 46 may be a break away stitch 46 configured to release when the airbag 22 is deployed. Alternatively, the stitch may continue to attach the tether 30 to the airbag 22 as the system 10 is deployed directing the load distributor 28 to the proper blocking position.

FIG. 4 also illustrates an alternative for securing the tethers 30 to the modular housing 26 is illustrated in FIG. 4. One or more apertures 40 are provided in the modular housing 26. The tethers 30 may be inserted through these apertures 40 and secured adjacent an external surface 44 of the modular housing 26. The tethers 26 may be secured on the external surface 44 of the modular housing 26 as described above. That is, by placing the reinforced openings located adjacent the tether ends 58, 59 over the stud 36 and securing the stud 36 to the modular housing 26.

Figures 5, 5A:
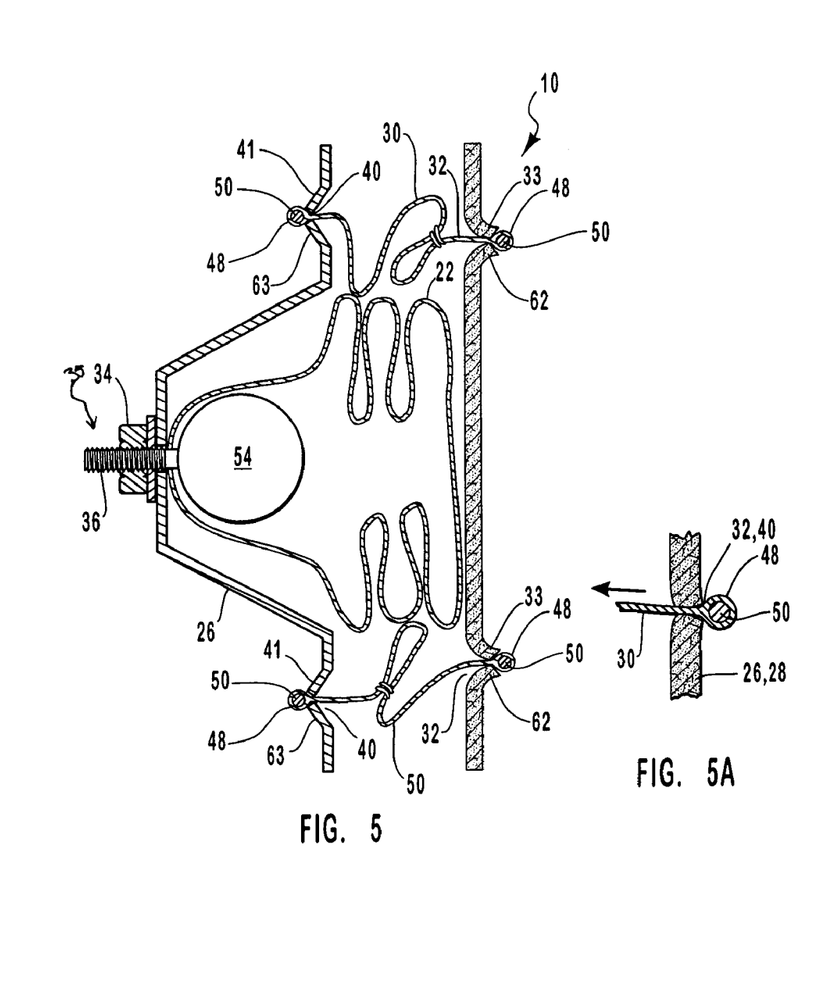
FIG. 5 is a cross sectional view of an alternate embodiment of the knee airbag system of FIG. 2 taken across line A—A.
FIG. 5A is a cross sectional view of a tether and slot/aperture of the embodiment of FIG. 5 showing the slot/aperture in a clamped configuration.

Referring now to FIG. 5, the system 10 further includes one or more retention rods 50 that laterally traverse the load distributor 28. The knee airbag system 10 is constructed as described above, but the attachment of the tethers 30 to the modular housing 26 and load distributor 28 is altered. The retention rods 50 are disposed adjacent retention slots 32. The retention rods 50 are configured with a diameter greater than the width of the retention slots 32. A portion of the tether 30 extends through the retention slot 32 and around a retention rod 50 In this manner, the load distributor 28 may be secured to the knee airbag system 10.

The attachment of the tethers 30 to the modular housing 26 and load distributor may be strengthened by configuring the slots 32 and apertures 40 with a flange 33, 41. The tethers 30 are attached between the housing 26 and load distributor 28 by inserting tether loops 48 into the slots 32 and apertures 40. Retention rods 50 are inserted into the loops 48 to secure the tethers 30 in place. The tethers 30 pass through the flanged slots 32 and apertures 40 with the tether loops 48 resting on the protrusions 62, 63. The flanges 33, 41 provide increased rigidity around the slots 32 and apertures 40. As shown in FIG. 5A, when the airbag system 10 is activated and the tethers 30 are loaded as the load distributor 28 moves to the blocking position, the loaded tethers 30 place a force on the flanges 33, 41 and the slots 32 and apertures 40 close and clamp down on the tethers 30.

Figure 6:
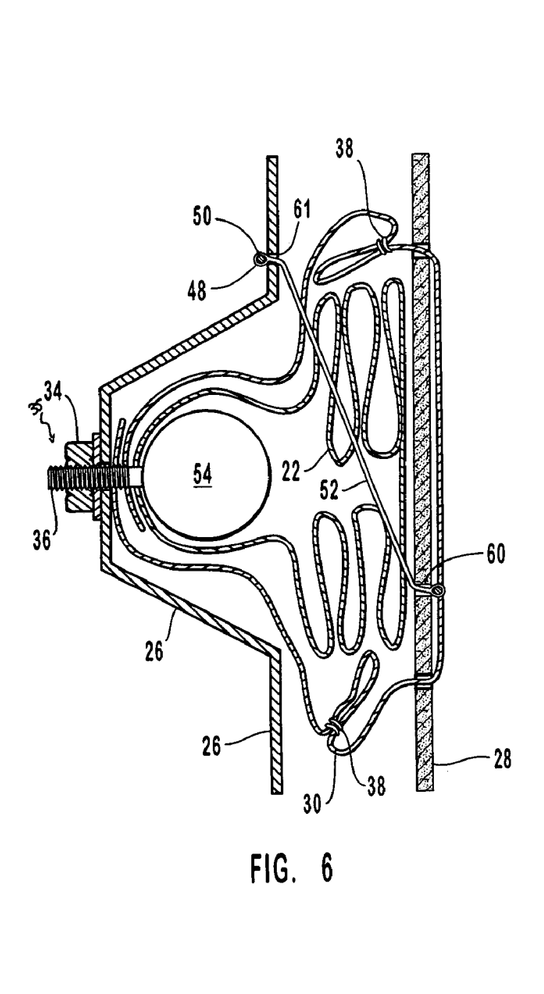
FIG. 6 is a cross sectional view of an alternate embodiment of the knee airbag system of FIG. 2 taken across line A—A.
Figure 7:
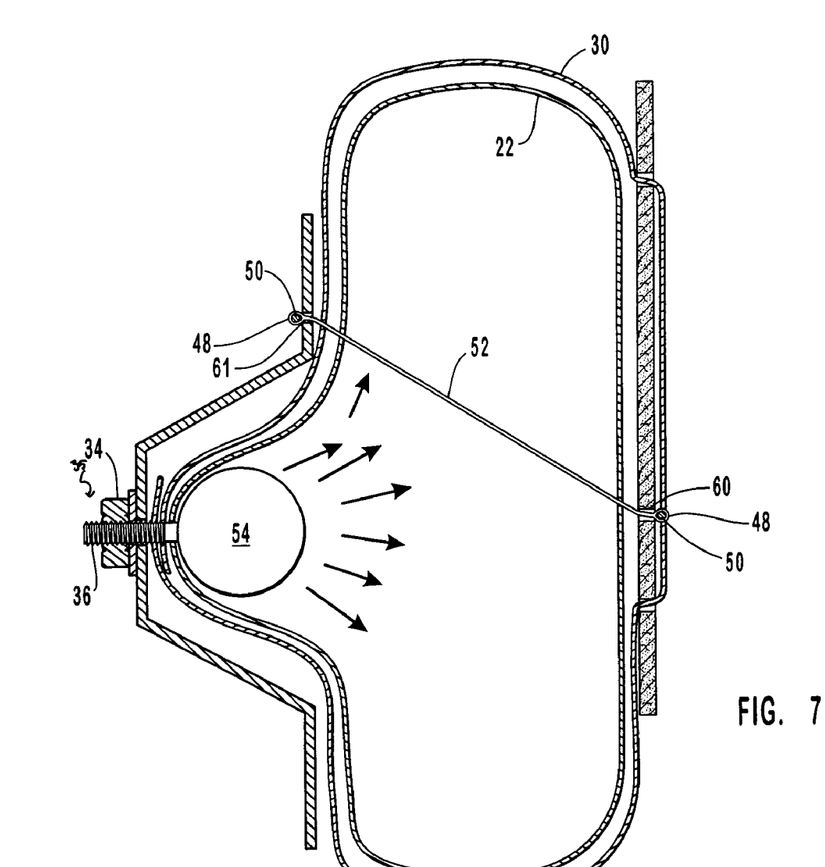
FIG. 7 is a cross sectional view of the embodiment of FIG. 6 showing the airbag system in the deployed position.

Referring now to FIG. 6, the system 10 further includes one or more pivoting tethers 52 connected between the modular housing 26 and the load distributor 28. The pivoting tether 52 can be attached to the load distributor 28 and modular housing 26 by inserting a tether loop 48 through openings 60, 61 in the housing 26 and load distributor 28. A retention rod 50 is placed within the loop 48. The pivoting tethers 52 are pulled taut due to the attachment locations and tether lengths. This allows the load distributor 28 to rotate up into position during deployment as shown in FIG. 7. Preferably the pivoting tethers 52 are located outside of the region occupied by the inflated cushion 22, i.e. on either side of the cushion, so that inflation of the cushion 22 is not hindered by the pivoting tethers 52.

It will be appreciated by those of skill in the art, that the various embodiments of the invention illustrated in FIGS. 1 through 7 have configurations and components that can be interchanged without departing from the scope of the invention. The present invention may be embodied in other specific forms without departing from its scope or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by Letters Patent is:

1. An airbag system for restraining and protecting an occupant of a vehicle comprising:
   an inflatable airbag;
   an inflator for inflating the airbag, the inflator in communication with the airbag;
   a housing configured to contain the airbag and inflator;
   a load distributor configured to be disposed between the airbag and the occupant when the airbag system is installed in the vehicle, the load distributor movable between a stored position prior to the inflation of the airbag and a deployed position following inflation of the airbag;
   a tether external to the inflatable airbag, connected to the load distributor and the housing; and
   a breakaway stitch attached to the tether for holding the tether in place when the load distributor is in the stored position, the breakaway stitch allowing for movement of the load distributor to the deployed position upon inflation of the inflatable airbag.

2. The airbag system of claim 1, wherein the housing further comprises a stud for attaching the inflator to the housing.

3. The airbag system of claim 2, wherein the tether is connected to the stud of the housing.

4. The airbag system of claim 1, wherein the load distributor comprises one or more slots for receiving the tether.

5. The airbag system of claim 4, further comprising a flange located adjacent the slots, the flange configured to close the slot and clamp down on the tether when the airbag is inflated.

6. The airbag system of claim 4, wherein the housing further comprises one or more apertures for receiving the tether, the slots and the apertures further comprising a flange located adjacent the slots, the flange configured to close the slot and clamp down on the tether when the airbag is inflated.

7. The airbag system of claim 1, wherein the housing further comprises one or more apertures for receiving the tether.

8. The airbag system of claim 7, wherein the tether is connected adjacent an external surface of the housing.

9. The airbag system of claim 7, further comprising a flange located adjacent the one or more apertures, the flange configured to close the slot and clamp down on the tether when the airbag is inflated.

10. The airbag system of claim 1, wherein the tether is attached to the airbag for positioning of the airbag system in the stored and deployed positions.

11. The airbag system of claim 1, further comprising a pivoting tether external to the airbag for positioning of the load distributor in the deployed position.

12. The airbag system of claim 1, further comprising a plurality of tethers, external to inflatable airbag, connected to the load distributor and the housing.

13. The airbag system of claim 12, wherein the plurality of tethers are held in place when the load distributor is in the stored position by a plurality of breakaway stitches.

14. An airbag system for restraining and protecting an occupant of a vehicle comprising:
- an inflatable airbag;
- an inflator for inflating the airbag, the inflator in communication with the airbag;
- a housing configured to connect the airbag and inflator to an instrument panel of the vehicle;
- a load distributor configured to be disposed between the airbag and the occupant when the airbag system is installed in the vehicle, the load distributor movable between a stored position prior to the inflation of the airbag and a deployed position following inflation of the airbag;
- a tether external to the inflatable airbag connected to the load distributor and the housing; and
- a breakaway stitch attached to the tether, th[0085] breakaway stitch configured to hold the tether within the housing when the load distributor is in the stored position and allowing for movement of the load distributor to the deployed position upon inflation of the inflatable bag.

15. The airbag system of claim 14, wherein the housing further comprises a stud for attaching the inflator to the housing, and wherein the tether is connected to the stud of the housing.

16. The airbag system of claim 15, wherein the slots are configured to clamp down on the tether when the airbag is inflated.

17. The airbag system of claim 15, wherein the housing further comprises one or more apertures for receiving the tether, the slots and the apertures configured to clamp down on the tether when the airbag is inflated.

18. The airbag system of claim 17, wherein the tether is connected adjacent an external surface of the housing.

19. The airbag system of claim 14, wherein the load distributor comprises one or more slots for receiving the tether.

20. The airbag system of claim 14, wherein the housing further comprises one or more apertures for receiving the tether.

21. The airbag system of claim 20, wherein the apertures are configured to clamp on the tether when the airbag is inflated.

22. The airbag system of claim 14, wherein the tether is attached to the airbag for positioning of the airbag system in the stored and deployed positions.

23. The airbag system of claim 14, further comprising a pivoting tether external to the airbag for positioning of the load distributor in the deployed position.

24. The airbag system of claim 23, wherein the plurality of tethers are held in place when the load distributor is in the stored position by a plurality of breakaway stitches.

25. The airbag system of claim 14, further comprising a plurality of tethers, external to the inflatable airbag, connected to the load distributor and the housing.

26. An airbag system for restraining and protecting an occupant of a vehicle comprising:
- an inflatable airbag;
- an inflator for inflating the airbag, the inflator in communication with the airbag;
- a housing configured to connect the airbag and the inflator to an instrument panel of the vehicle;
- a load distributor configured to be disposed between the airbag and the occupant, the load distributor movable between a stored position adjacent the instrument panel and an a deployed position away from the instrument panel;
- a plurality of tethers, external to the inflatable airbag, connected to the load distributor and the housing;
- a plurality of breakaway stitches for holding the tethers in place when the load distributor is in the stored position and allowing for movement of the load distributor to the deployed position upon inflation of the inflatable airbag.

27. The airbag system of claim 26, wherein the housing further comprises a stud for attaching the inflator to the housing, and wherein the tethers are connected to the stud of the housing.

28. The airbag system of claim 26, wherein the load distributor comprises one or more slots for receiving the tethers, and the housing further comprises one or more apertures for receiving the tethers, the slots and the apertures configured to clamp down on the tethers when the airbag is inflated.

29. The airbag system of claim 26, wherein the tethers are attached to the airbag for positioning of the airbag system in the stored and deployed positions.

30. The airbag system of claim 26, further comprising a pivoting tether external to the airbag for positioning of the load distributor in the deployed position.

31. An airbag system for restraining and protecting an occupant of a vehicle comprising:
- an inflatable airbag;
- an inflator for inflating the airbag, the inflator in communication with the airbag;
- a housing configured to contain the airbag and inflator;
- a load distributor configured to be disposed between the airbag and the occupant when the airbag system is installed in the vehicle, the load distributor movable between a stored position prior to the inflation of the airbag and a deployed position following inflation of the airbag; and
- a plurality of tethers. external to the inflatable airbag, connected to the load distributor and the housing wherein the plurality of tethers are held in place when the load distributor is in the stored position by a plurality of breakaway stitches.

32. An airbag system for restraining and protecting an occupant of a vehicle comprising:

an inflatable airbag;

an inflator for inflating the airbag, the inflator in communication with the airbag;

a housing configured to contain the airbag and inflator to an instrument panel of the vehicle;

a load distributor configured to be disposed between the airbag and the occupant when the airbag system is installed in the vehicle, the load distributor movable between a stored position prior to the inflation of the airbag and a deployed position following inflation of the airbag wherein the load distributor comprises one or more slots for receiving the tether; and a tether external to the airbag connected to the load distributor and the housing wherein the slots are configured to clamp down on the tether when the airbag is inflated.

33. An airbag system for restraining and protecting an occupant of a vehicle comprising:

an inflatable airbag;

an inflator for inflating the airbag, the inflator in communication with the airbag;

a housing configured to contain the airbag and inflator to an instrument panel of the vehicle wherein the housing further comprises one or more slots and one or more apertures;

a load distributor configured to be disposed between the airbag and the occupant when the airbag system is installed in the vehicle, the load distributor movable between a stored position prior to the inflation of the airbag and a deployed position following inflation of the airbag; and a plurality of tethers external to the inflatable airbag, connected to the load distributor and the housing wherein the slots and the apertures are configured to receive the plurality of tethers and to clamp down on the tether when the airbag is inflated.

34. An airbag system for restraining and protecting an occupant of a vehicle comprising:

an inflatable airbag;

an inflator for inflating the airbag, the inflator in communication with the airbag;

a housing configured to contain the airbag and inflator, the housing further comprising one or more apertures;

a load distributor configured to be disposed between the airbag and the occupant when the airbag system is installed in the vehicle, the load distributor movable between a stored position prior to the inflation of the airbag and a deployed position following inflation of the airbag;

a tether external to the inflatable airbag, connected to the load distributor and the housing wherein the apertures are configured to receive the tether and to clamp on the tether when the airbag is inflated.

35. An airbag system for restraining and protecting an occupant of a vehicle comprising:

an inflatable airbag;

an inflator for inflating the airbag, the inflator in communication with the airbag;

a housing configured to contain the airbag and inflator to an instrument panel of the vehicle;

a load distributor configured to be disposed between the airbag and the occupant when the airbag system is installed in the vehicle, the load distributor movable between a stored position prior to the inflation of the airbag and a deployed position following inflation of the airbag;

a plurality of pivoting tethers external to the inflatable airbag for positioning of the load distributor in the deployed position wherein the plurality of tethers are held in place when the load distributor is in the stored position by a plurality of breakaway stitches.

* * * * *